(12) United States Patent
Zhao et al.

(10) Patent No.: US 12,426,768 B2
(45) Date of Patent: Sep. 30, 2025

(54) SPRAY ARM, AND WATER PUMPING MECHANISM AND CLEANING MACHINE THEREOF

(71) Applicant: Ningbo Fotile Kitchen Ware Co., Ltd., Ningbo (CN)

(72) Inventors: Shuhan Zhao, Ningbo (CN); Feng Zheng, Ningbo (CN); Benzhu Wei, Ningbo (CN); Yonglei Yao, Ningbo (CN); Zhengzan Shi, Ningbo (CN); Changhai Zhang, Ningbo (CN); Jianjian Han, Ningbo (CN); Yong Jiang, Ningbo (CN)

(73) Assignee: Ningbo Fotile Kitchen Ware Co., Ltd., Ningbo (CN)

( * ) Notice: Subject to any disclaimer, the term of this patent is extended or adjusted under 35 U.S.C. 154(b) by 239 days.

(21) Appl. No.: 18/258,646

(22) PCT Filed: Jan. 26, 2022

(86) PCT No.: PCT/CN2022/074075
§ 371 (c)(1),
(2) Date: Jun. 21, 2023

(87) PCT Pub. No.: WO2022/135614
PCT Pub. Date: Jun. 30, 2022

(65) Prior Publication Data
US 2024/0041295 A1     Feb. 8, 2024

(30) Foreign Application Priority Data
Dec. 21, 2020   (CN) ........................ 202011514851.X

(51) Int. Cl.
*A47L 15/42*     (2006.01)
*A47J 43/24*     (2006.01)
*A47L 15/23*     (2006.01)

(52) U.S. Cl.
CPC .......... *A47L 15/4278* (2013.01); *A47J 43/24* (2013.01); *A47L 15/23* (2013.01); *A47L 15/4217* (2013.01);
(Continued)

(58) Field of Classification Search
CPC .......... A47L 15/16; A47L 15/18; A47L 15/20; A47L 15/22; A47L 15/23; A47L 15/4278; A47L 15/428; B05B 7/005; B05B 7/0425
See application file for complete search history.

(56) References Cited

U.S. PATENT DOCUMENTS

| | | | | |
|---|---|---|---|---|
| 4,135,670 A | * | 1/1979 | Sugimoto | ............. B05B 7/0425 239/553.3 |
| 5,918,817 A | * | 7/1999 | Kanno | .................. B05B 7/0433 239/433 |

* cited by examiner

*Primary Examiner* — David G Cormier
(74) *Attorney, Agent, or Firm* — Wang Law Firm, Inc.

(57) ABSTRACT

A spray arm, a water pumping mechanism and a cleaning machine thereof are disclosed in the present invention. The spray arm comprises a body (1;1') and a top plate (2;2'). An air collection chamber (20;20') is defined between the top plate (2;2') and the top surface (1a; 1a') of the body (1;1'), a plurality of water spray holes (13) is arranged in the air collection chamber (20;20'), the top plate (2;2') has a plurality of spray openings (21) each corresponding to one water spray hole (13), and a gap (100) is formed between a top end of each water spray hole (13) and a bottom end of the corresponding spray opening (21). According to the Venturi effect, the air in the air collection chamber can be sucked into the spout through the gap when the water flow passes through the water spray hole and is jetted out through the spray opening, such that bubbles are entrained in the jet flow; the bubbles are broken on surfaces of dishes or fruits and vegetables, which can improve dirt stripping force, and improve the washing effect.

20 Claims, 12 Drawing Sheets

(52) U.S. Cl.
CPC ....... *A47L 15/4246* (2013.01); *A47L 2601/02* (2013.01)

SPRAY ARM, AND WATER PUMPING MECHANISM AND CLEANING MACHINE THEREOF

TECHNICAL FIELD OF THE INVENTION

The present invention relates to the field of kitchen appliances, and in particular to a spray arm used in a cleaning machine for washing dishes or fruit or vegetables, and the present invention also relates to a water pumping mechanism and a cleaning machine thereof.

BACKGROUND OF THE INVENTION

As living standards ever improve, a dishwasher, a household appliance used in a kitchen, gains popularity among many families. Desktop, cabinet and trough dishwashers are sold on the market. The desktop dishwasher is usually placed on the table in an integrated and independent structure. The cabinet dishwasher needs to be embedded in a kitchen cabinet in an independent structure. The trough dishwasher is usually mounted in the kitchen cabinet combining a sink.

In general, the various dishwashers pump water through a water pump and spray it to dishes in a cleaning space for cleaning. For example, a Chinese patent CN2292516Y (patent No.: CN97236119.7) disclosed a microcomputer light-controlled fully-automatic dishwasher and a Chinese patent CN2452448Y (patent No.: CN00240098.7) disclosed a dishwasher. The two dishwashers both disclosed a similar structure. In this structure, water flows sprayed on the dishes is weak and uneven in impact force, and is insufficient to cover numerous dishes, resulting in a poor washing effect. A Chinese Patent CN101204313A (patent No.: CN200710306898.5) disclosed a dishwasher equipped with device for improving cleaning effect, especially a household dishwasher with a vaporization device which is arranged to generate fluid mist that may be introduced into a cavity of the dishwasher, so as to expand a cleaning area of water flows sprayed on dishes and improve uniformity of a washing medium. But weak impact force of sprayed water flows is still unsolved. A Chinese Patent CN106235981A (patent No.: CN201610795828.X) disclosed a large-sized ultrasonic automatic dishwasher with an ultrasonic emitter device, and high-pressure air is input into a washing liquid. The ultrasonic emitter device is used to make input high-pressure air form bubbles in a washing liquid, and an ultrasonic transducer is used to provide energy for the washing liquid, such that the bubbles in the washing liquid burst to generate impact force, and impact force of water flows is improved. However, in such a structure, instantaneous bubble burst between ultrasonic waves and the high-pressure bubbles needs to be kept in the water. When the water flows are pumped by a water pump and sprayed out circularly, high-pressure bubbles are difficult to reach the surfaces of dishes before burst, the structure is not suitable for a structure of a water-jet dishwasher or a household dishwasher, but merely large-sized ones.

In order to solve the problem above, as disclosed in a prior application, a Chinese Patent CN208243529U (patent No.: CN201721042431.X) of the applicant, a washing effect is improved by adding air to a spray arm to entrain bubbles in water flows. An air pump is required for blowing air into the spray arm, resulting in a complicated structure and high production cost.

SUMMARY OF THE INVENTION

It is a first object of the present invention to provide a spray arm which can automatically suck air and entrain bubbles in a jet water flow, thereby improving the washing effect and achieving low production cost.

It is a second object of the present invention to provide a spray arm that can stably aerate the jet water flow.

It is a third object of the present invention to provide a water pumping mechanism with the spray arm above.

It is a fourth object of the present invention to provide a cleaning machine with the water pumping mechanism above.

For achieving the first object, the spray arm comprises a body having a top surface, a bottom surface and a side wall between the top surface and the bottom surface, a top plate disposed above the body; wherein, the body has a flow channel extending along a length of the body; the body has a water inlet in communication with the flow channel arranged on the bottom surface of the body; the body has a plurality of water spray holes arranged on the top surface and/or the sidewall of the body; an air collection chamber for storing air is defined between the top plate and the top surface of the body, the positions of the water spray holes are distributed corresponding to the air collection chamber; the top plate has a plurality of spray openings each corresponding to one water spray hole, and a gap where negative pressure is generated during water flow spraying is formed between a top end of each water spray hole and a bottom end of the corresponding spray opening; and an air inlet in communication with the air collection chamber is arranged on the top plate and/or the side wall of the body.

Preferably, the body has two ends and a central portion, the top surface of the body has a recessed area gradually sinking downward from the two ends to the central portion which is defined as a drainage area, a water outlet for draining water is arranged at an edge of the drainage area. In a process of washing dishes by jetting water flows upwards by the spray arm, water flows may unavoidably hit the spray arm when falling back, and water stains are always on the surface of the spray arm, making it easy to suck a small amount of water into the air collection chamber; after a long term of time, an air storage amount in the air collection chamber can be affected, and also the amount of air aerated into a jet spout is affected, and bacteria are likely to breed in the air collection chamber. However, by using the structure above, accumulated water in the air collection chamber can be drained in time, thus improving the stability of aeration.

Preferably, the top plate has a top wall and a side wall, the body has a top wall extending upward from the top surface of the body corresponding to the side wall of the top plate, the edge of the drainage area is enclosed by the top wall, and the water outlet is located at a bottom of the top wall.

Preferably, the plurality of water spray holes is located at the side wall of the body.

As an improvement of the spray arm, the body has a water collection chamber in communication with the water inlet at the central portion of the body and under the top surface of the body, and the drainage area is located above the water collection chamber.

Preferably, a mounting hole at the top surface of the body corresponding to the water collection chamber, the mounting hole is in communication with the drainage area and is for receiving an output shaft of a power mechanism, a sealing ring is arranged in the mounting hole to prevent water from entering the air collection chamber from the water collection chamber. The mounting hole can receive a top end of the output shaft, thus facilitating receiving the upper end of the output shaft of the power mechanism; the sealing ring can prevent water in the water collection chamber from entering the air collection chamber, further, accumulated water in the drainage area flows through the mounting hole to keep the sealing ring lubricated, so that friction generated at the upper end can be reduced when the output shaft of the power mechanism rotates, thereby reducing energy consumption. In addition, in the process of cleaning, the top of the water collection chamber will generate negative pressure under the rotation of an impeller, so that the accumulated water in the drainage area is sucked into the mounting hole to form water seal together with the sealing ring, thereby avoiding loss of an air in the air collection chamber and loss of the negative pressure at the top of the water collection chamber.

In order to facilitate assembly, preferably, the body has a mounting recess arranged around the mounting hole and opening toward the water collection chamber, the sealing ring is arranged inside the mounting recess, the sealing ring has a shaft hole at a center of the sealing ring for receiving the output shaft, and the sealing ring resists against an inner wall of the mounting recess. The above design facilitates improvement of a sealing performance of the mounting recess after assembly.

Preferably, a gap is defined between an inner wall of the mounting hole of the body and a periphery of the output shaft, the sealing ring has an annular liquid collection recess opening upward around the shaft hole, the mounting hole is in communication with the liquid collection recess. Under such design, after passing through the mounting hole, the accumulated water in the drainage area can enter the liquid collection recess for being always stored therein, so as to keep the sealing ring moist and achieve a lubricating effect.

Preferably, an annular border is arranged at the drainage area between an inner surface of the top plate and the top surface of the body, and the annular border has a plurality of notches for water to go through. This structure facilitates reduction of airflow disturbance in the air collection chamber and improves the stability of aeration.

Preferably, the water outlet is located at the top surface of the body, and the body has an inclined diversion plane at the bottom of the water outlet which gradually inclines downward from inside to outside of the body, a top of the inclined diversion plane is approximately flush with the top surface of the body. Under such design, on the one hand, quick drainage of the accumulated water is facilitated, and on the other hand, external oil does not enter the air collection chamber easily.

Preferably, the air inlet is located at the side wall at the end of the body. The body has an inclined plane at the bottom of the air inlet which gradually inclines downward from inside to outside of the body, a top of the inclined plane is approximately flush with the top surface of the body. Under such design, external oil does not enter the air collection chamber easily.

Preferably, the body has a plurality of first nozzles each protruding upward from the top surface of the body around a corresponding water spray hole, and correspondingly, the top plate has a plurality of second nozzles each extending upward around a corresponding spray opening. The first nozzle and the second nozzle facilitate diversion of water flows, so as to form a spout with a great jet force.

Preferably, each first nozzle has a tapered section and a first straight section connected to the tapered section arranged along a direction of water flow, and an inner diameter of the tapered section gradually decreases along the direction of water flow. An inner diameter of each second nozzle is greater than an inner diameter of a top end of the first nozzle. The tapered section facilitates reduction of energy loss of a fluid entering the first nozzles from the flow channels. According to the Venturi effect, when a constricted fluid passes through a reduced overflowing section, the flow speed of the fluid will increase. Moreover, from the Bernoulli's law, it is determined that an increase of the flow speed is accompanied by a decrease of a fluid pressure, so that a low pressure will be generated near a fluid flowing at a high flow speed, and then a sucking effect will be generated. The first straight section of this embodiment of the spray arm is intended to achieve effects of reduction of the section and increase of the flow speed, so that air in the air collection chamber can be sucked into the water flow through the gap.

Preferably, an axial length of each second nozzle is 5 mm-7 mm. The second nozzles of the present invention are mainly used for air-liquid mixing, and the size of the second nozzles determines state stability after air-liquid mixing. If the second nozzles are too long, jet flow energy will be lost, and if the second nozzles are too short, air-liquid mixing state will be unstable. Upon verification, a fluid with a high speed and a stable state after air-liquid mixing can be obtained by using the length parameter above.

Preferably, a width of the gap between the top end of each first nozzle and a bottom end of each second nozzle is 2 mm-5 mm. This gap determines a jet flow cavitation capacity, that is, the amount of air sucked. Upon verification, a higher jet flow cavitation effect can be achieved by using the length parameter above.

Preferably, the thickness of the central portion of the body is greater than the thicknesses of the flow channels at two sides, and the central portion of the body sinks downward relative to the flow channels at two sides of the central portion of the body, so that the spray arm is in a "flying swallow" shape as a whole, facilitating reduction of resistance during rotation of the spray arm and improvement in movement efficiency.

For achieving the third object, the water pumping mechanism with the spray arm comprises a power mechanism, an impeller assembly having an upper portion and a lower portion, the spray arm; wherein, the upper portion of the impeller assembly is a centrifugal impeller that passes through the water inlet and is located inside the spray arm, and the lower portion of the impeller assembly is an axial impeller arranged below the water inlet, the power mechanism is arranged below the impeller assembly, and the output shaft is connected to the impeller assembly.

For achieving the fourth object, the cleaning machine with the water pumping mechanism comprises a box having a bottom; wherein, the water pumping mechanism is disposed at the bottom of the box for pumping the water at the bottom of the box upward through the spray arm.

Compared with the prior art, the spray arm of the present invention, the water pump mechanism and the cleaning machine thereof has the following advantages. The air collection chamber is arranged at the top of the spray arm, and the spray openings corresponding to the water spray holes are arranged at intervals on the top plate. According to the Venturi effect, the air in the air collection chamber can be sucked into the spout through the gap between the water spray hole and the spray opening when the water flow passes through the water spray hole and is jetted out through the spray opening, such that bubbles are entrained in the jet flow; the bubbles are broken on surfaces of dishes or fruits and vegetables, which can improve dirt stripping force, and improve the washing effect. According to the spray arm of the present invention, the water pump mechanism and the cleaning machine thereof, the air is aerated into the jet flow through self-suction, and an air pump is not required, greatly reducing the production cost.

DETAILED DESCRIPTION OF THE INVENTION

Figure 1:
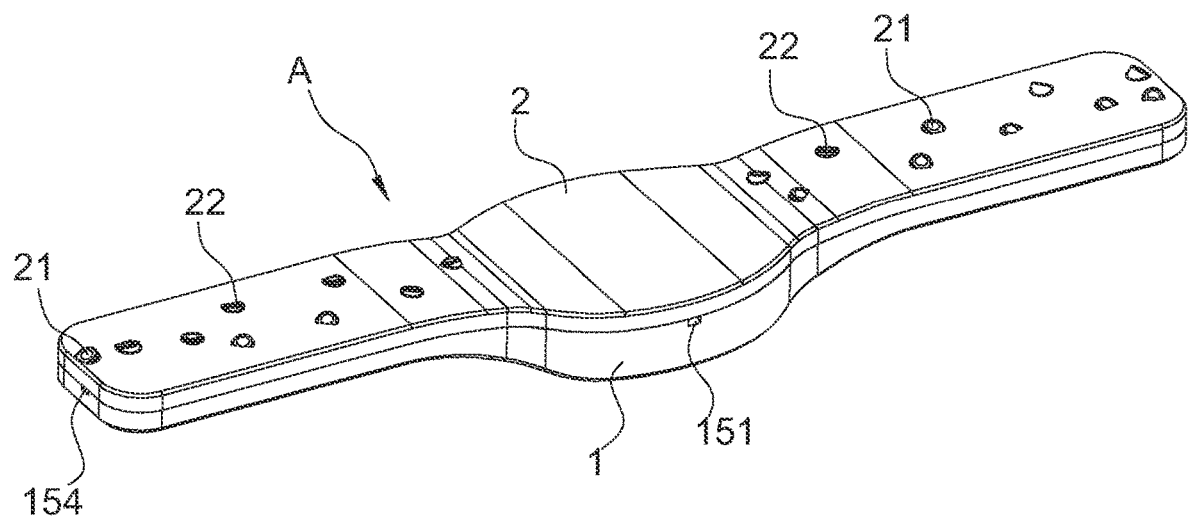
FIG. 1 is a perspective view of a spray arm according to Embodiment 1 of the present invention.
Figure 2:
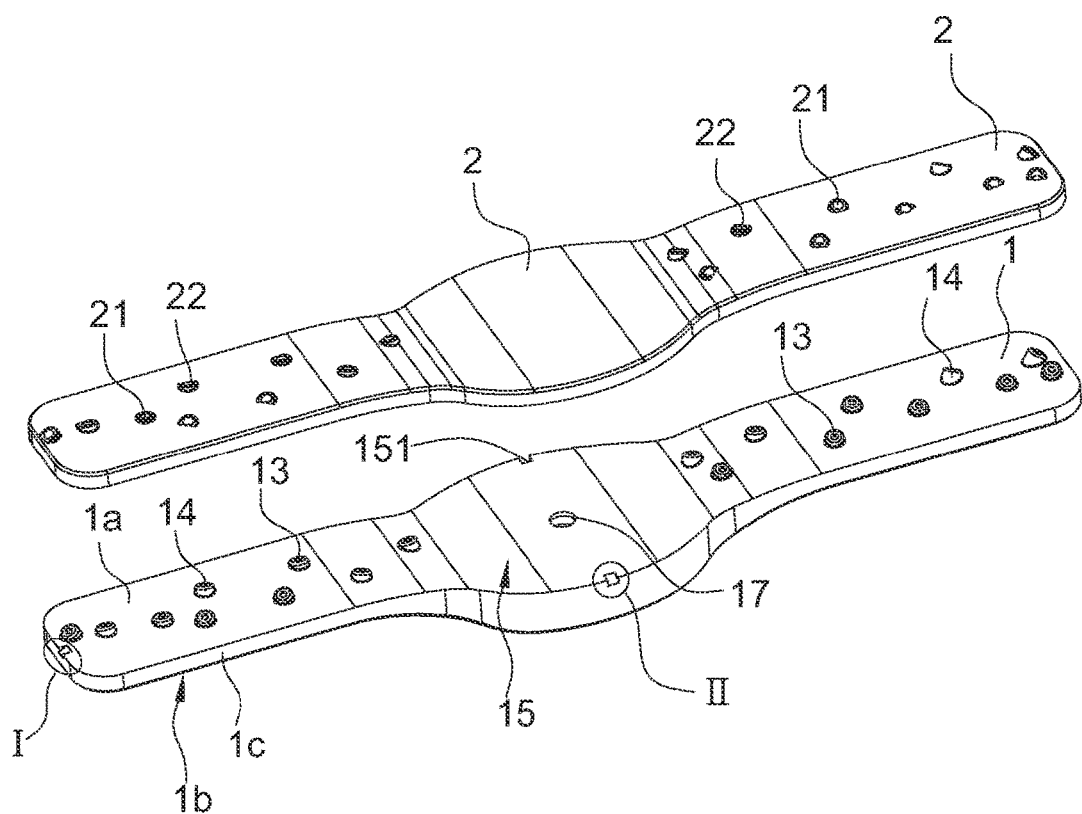
FIG. 2 is an exploded view of FIG. 1.
Figure 3:
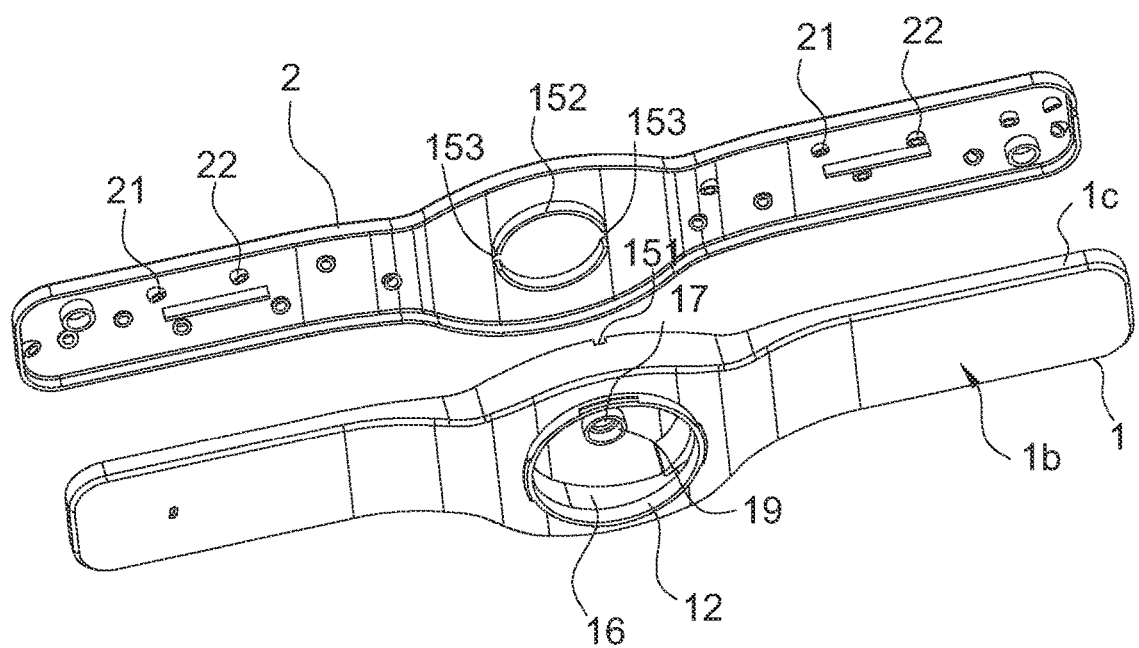
FIG. 3 is another exploded view of FIG. 1.
Figures 4, 5:
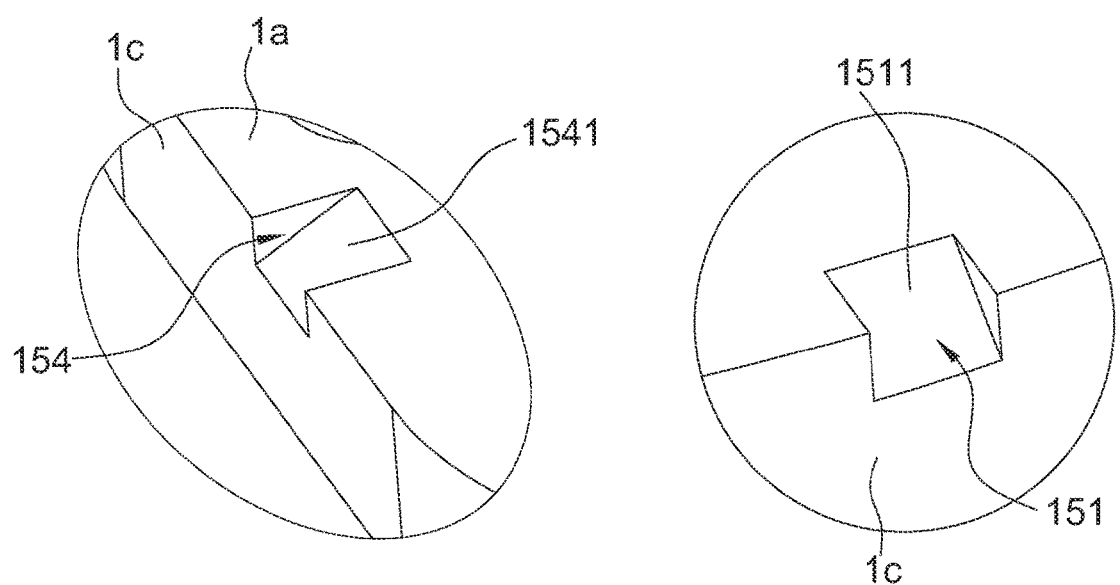
FIG. 4 is an enlarged view of part-I in FIG. 2.
FIG. 5 an enlarged view of part-II in FIG. 2.
Figure 6:
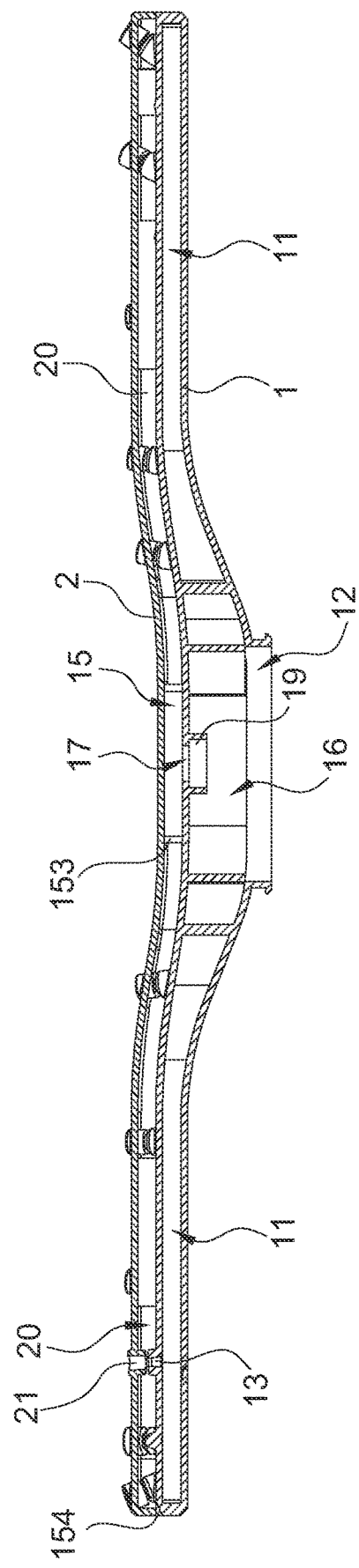
FIG. 6 is a sectional view of FIG. 1.
Figure 7:
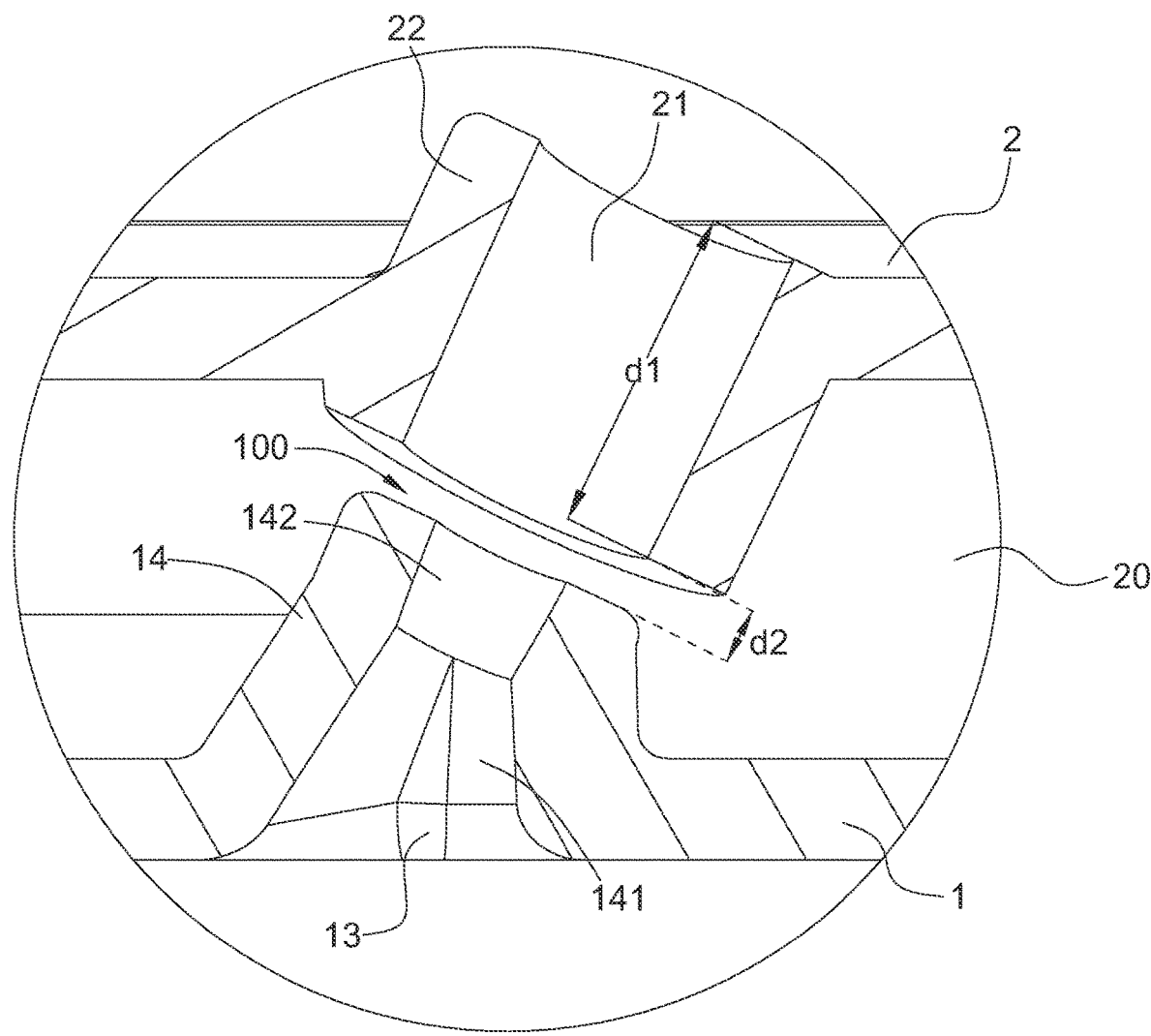
FIG. 7 is a sectional view of a first nozzle and a second nozzle with a gap according to Embodiment 1 of the present invention.

The present invention will be further described below in detail by embodiments with reference to the accompanying drawings.

Embodiment 1

FIGS. 1-7 show a first preferred embodiment of the spray arm of the present invention. The spray arm A of this embodiment comprises a body 1 and a top plate 2 covering the body 1.

In this embodiment, the body 1 is flat and strip-shaped, hollow inside, and bilaterally symmetrical in overall shape. The body 1 has two ends and a central portion, the central portion is wider than left and right ends. The body 1 has a top surface 1a, a bottom surface 1b and a side wall 1c defined between the top surface 1a and the bottom surface 1b.

The hollow body 1 has a flow channel 11 extending along a length of the body 1 from the left end to the right end of the body 1, and a disc-shaped water collection chamber 16 located in the central portion of the body 1 and just dividing the flow channel 11 into two parts. The water collection chamber 16 is in communication with the flow channel 11 located at the two sides of the water collection chamber 16. The body 1 has a water inlet 12 in communication with the water collection chamber 16 at the bottom surface 1b of the body 1, the body 1 has a plurality of water spray holes 13 at the top surface 1a, the plurality of water spray holes 13 are distributed above the flow channels 11, and no water spray holes are provided above the water collection cavity 16.

An air collection chamber 20 in communication with outside air is defined between the top plate 2 and the top surface 1a of the body 1. The positions of the water spray holes 13 are distributed corresponding to the air collection chamber 20 and encircled in the air collection chamber 20. The top plate 2 has a plurality of spray openings 21 each corresponding to one water spray hole 13, and a gap 100 is formed between a top end of each water spray hole 13 and a bottom end of the corresponding spray opening 21.

According to this embodiment, the thickness of the central portion of the spray arm A is greater than that of the flow channels 11 at two sides, and the central portion of the spray arm A is sunk downwards relative to the flow channels 11 at two sides, so that the spray arm A is in a "flying swallow" shape as a whole, facilitating reduction of resistance during rotation of the spray arm and improvement in movement efficiency.

The body 1 has a plurality of first nozzles 14 each protruding upward from the top surface 1a of the body 1 around a corresponding water spray hole 13, and correspondingly, the top plate 2 has a plurality of second nozzles 22 each extending upward around a corresponding spray opening 21. The first nozzles 14 and the second nozzles 22 facilitate diversion of water flows, so as to form a spout with large jet force.

Specifically, each first nozzle 14 has a tapered section 141 and a first straight section 142 connected to the tapered section 141 arranged along a direction of water flow, and an inner diameter of the tapered section 141 gradually decreases along the direction of water flow. An inner diameter of each second nozzle 22 is greater than an inner diameter of a top end of the first nozzle 14. The tapered section 141 facilitates reduction of energy loss of a fluid entering the first nozzles 14 from the flow channels. According to the Venturi effect, when a constricted fluid passes through a reduced overflowing section, the flow speed of the fluid will increase. Moreover, from the Bernoulli's law, it is determined that an increase of the flow speed is accompanied by a decrease of a fluid pressure, so that a low pressure will be generated near a fluid flowing at a high flow speed, and then a sucking effect will be generated. The first straight section 142 of this embodiment of the spray arm is intended to achieve effects of reduction of the section and increase of the flow speed, so that air in the air collection chamber 20 can be sucked into the water flow through the gap 100.

An axial length d1 of each second nozzle 22 is 5 mm-7 mm. The second nozzle 22 of this embodiment is mainly used for air-liquid mixing, and the size of the second nozzles 22 determines state stability after air-liquid mixing. If the second nozzles 22 are too long, jet flow energy will be lost, and if the second nozzles are too short, air-liquid mixing state will be unstable. Upon verification, a fluid with a high speed and a stable state after air-liquid mixing can be obtained by using the length parameter above. The width d2 of the gap 100 between the upper end of each water spray hole 13 and the lower end of each spray opening 21 is 2 mm-5 mm. This gap 100 determines a jet flow cavitation capacity, that is, the amount of air sucked. Upon verification, a higher jet flow cavitation effect can be achieved by using the length parameter above.

In this embodiment, the body 1 has two ends and a central portion, the top surface 1a of the body 1 has a recessed area gradually sinking downward from the two ends to the central portion which is defined as a drainage area 15, a water outlet 151 for draining water is arranged at an edge of the drainage area 15. In a process of washing dishes by jetting water flows upwards by the spray arm, water flows may unavoidably hit the spray arm when falling back, and water stains are always on the surface of the spray arm, making it easy to suck a small amount of water into the air collection chamber 20; after a long term of time, an air storage amount in the air collection chamber 20 can be affected, and also the amount of air aerated into a jet spout is affected, and bacteria are likely to breed in the air collection chamber 20. However, by using the structure above, accumulated water in the air collection chamber 20 can be drained in time, thus improving the stability of aeration.

The water outlet 151 is located at the top surface 1a of the body 1, and the body 1 has an inclined diversion plane 1511 at the bottom of the water outlet 151 which gradually inclines downward from inside to outside of the body 1, a top of the inclined diversion plane 1511 is approximately flush with the top surface 1a of the body 1. By using such a structure, on the one hand, quick drainage of the accumulated water is achieved, and on the other hand, external oil does not enter the air collection chamber 20 easily.

Figure 8:
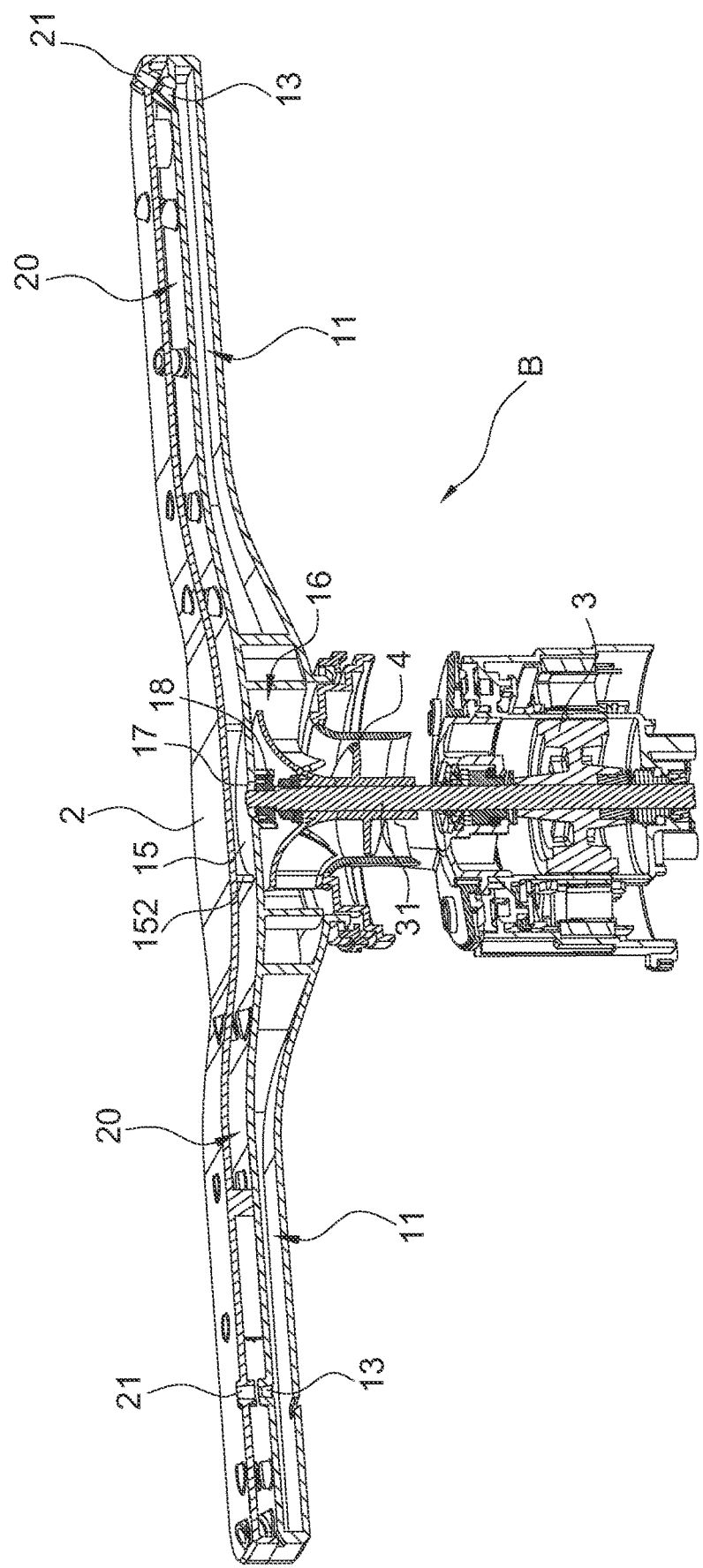
FIG. 8 is a sectional view of a water pumping mechanism according to Embodiment 1 of the present invention.
Figure 9:
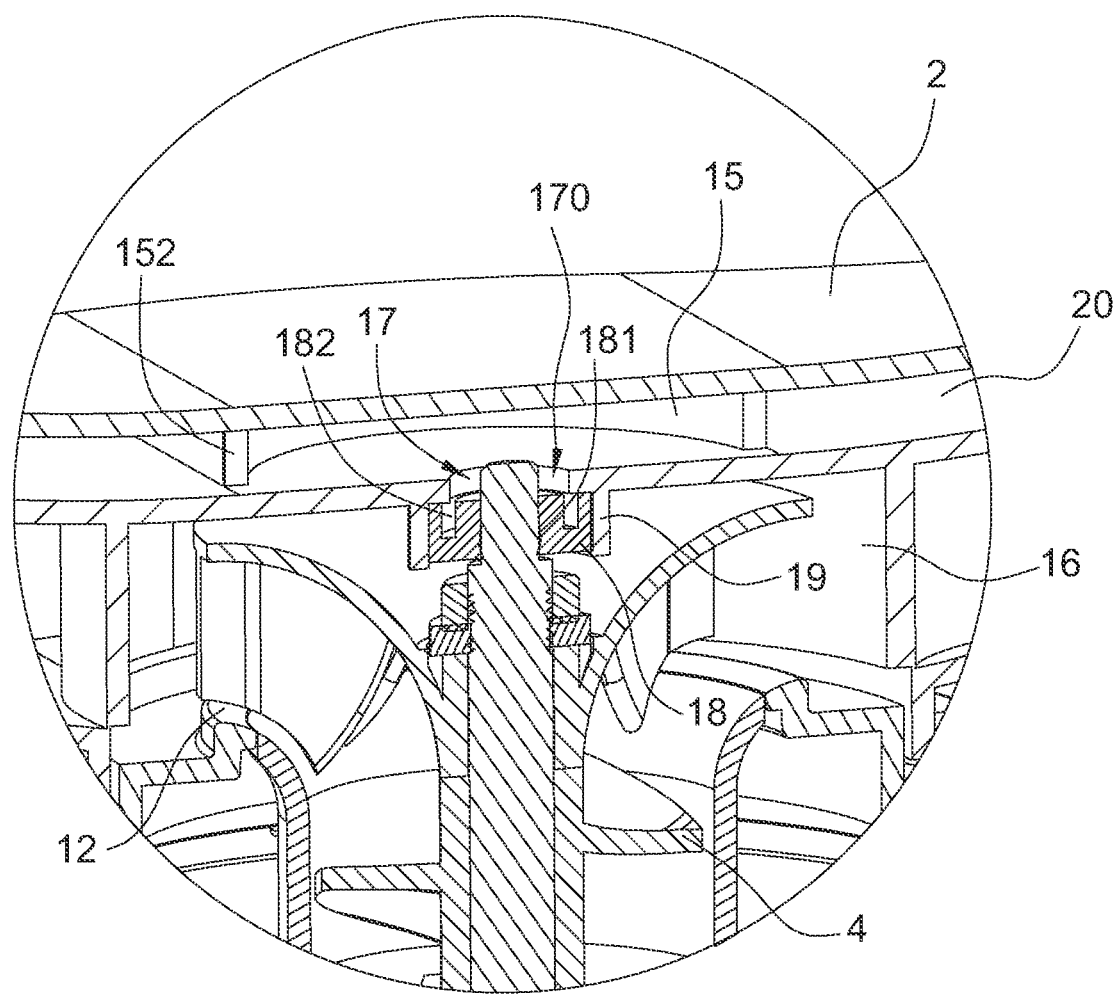
FIG. 9 is a partial enlarged view of FIG. 8.

In this embodiment, the drainage area 15 is located above the water collection chamber 16, the body 1 has a mounting hole 17 at the top surface 1a of the body 1 corresponding to the water collection chamber 16, the mounting hole 17 is in communication with the drainage area 15 and is for receiving an output shaft 31 of a power mechanism 3, as shown in FIGS. 8-9, a sealing ring 18 is arranged in the mounting hole 17 to prevent water from entering the air collection chamber 20 from the water collection chamber 16. The mounting hole 17 can receive an upper end of the output shaft 31, thus facilitating receiving the upper end of the output shaft 31 of the power mechanism 3; the sealing ring 18 can prevent water in the water collection chamber 16 from entering the air collection chamber 20, further, accumulated water in the drainage area 15 flows through the mounting hole 17 to keep the sealing ring 18 lubricated, so that friction generated at the upper end can be reduced when the output shaft 31 of the power mechanism 3 rotates, thereby reducing energy consumption. In addition, in the process of cleaning, the top of the water collection chamber 16 will generate negative pressure under the rotation of an impeller, so that the accumulated water in the drainage area 15 is sucked into the mounting hole 17 to form water seal together with the sealing ring 18, thereby avoiding loss of an air in the air collection chamber 20 and loss of the negative pressure at the top of the water collection chamber 16.

In order to facilitate assembly, the body 1 has a mounting recess 19 arranged around the mounting hole 17 and opening toward the water collection chamber 16, the sealing ring 18 is arranged inside the mounting recess 19, the sealing ring 18 has a shaft hole 181 at a center of the sealing ring 18 for receiving the output shaft 31, and the sealing ring 18 resists against an inner wall of the mounting recess 19.

A gap 170 is defined between an inner wall of the mounting hole 17 of the body 1 and a periphery of the output shaft 31, the sealing ring 18 has an annular liquid collection recess 182 opening upward around the shaft hole 181, and the mounting hole 17 is in communication with the liquid collection recess 182. By using the structure above, after passing through the mounting hole 17, the accumulated water in the drainage area 15 enters the liquid collection recess 182 and is always stored therein, so as to keep the sealing ring 18 moist and achieve a lubricating effect. In this embodiment, the central portion of the drainage area 15 has an annular border 152 around the mounting hole 17, and the annular border 152 has a plurality of notches 153 for water to flow in the annular border 152 from outside of the annular border 152. In this embodiment, the annular border 152 is integrally connected to the top plate 2, and the bottom of the annular border 152 resists against the top surface 1a of the body 1. This structure facilitates reduction of airflow disturbance in the air collection chamber 20 and improves the stability of aeration.

In this embodiment, a side portion of the spray arm A, that is, the side wall 1c of the body 1, has an air inlet 154 in communication with the air collection chamber 20 at a left end of the body 1. An inclined plane 1541 at the bottom of the air inlet 154 which gradually inclines downward from inside to outside of the body 1, a top of the inclined plane 1541 is approximately flush with the top surface 1a of the body 1. By using such a structure, external oil does not enter the air collection chamber 20 easily.

FIGS. 8-9 show a first preferred embodiment of the water pumping mechanism B with the spray arm of the present invention. In this embodiment of the water pumping mechanism B, the water pumping mechanism B comprises a power mechanism 3, an impeller assembly 4, and the spray arm A. The upper portion of the impeller assembly 4 is a centrifugal impeller that passes through the water inlet 12 and is located inside the spray arm A, and the lower portion of the impeller assembly 4 is an axial impeller arranged below the water inlet 12, the power mechanism 3 is arranged below the impeller assembly 4, and the output shaft 31 is connected to the impeller assembly 4. The output shaft 31 of the power mechanism 3 passes through the top surface 1a of a body 1 to be inserted into the mounting hole 17.

The spray arm of the present invention, a water pumping mechanism and a cleaning machine thereof also comprises a cleaning machine. The cleaning machine of this embodiment comprises a box having a bottom and the water pumping mechanism B. The water pumping mechanism B is disposed at the bottom of the box for pumping the water at the bottom of the box upward through the spray arm A.

Embodiment 2

Figure 10:
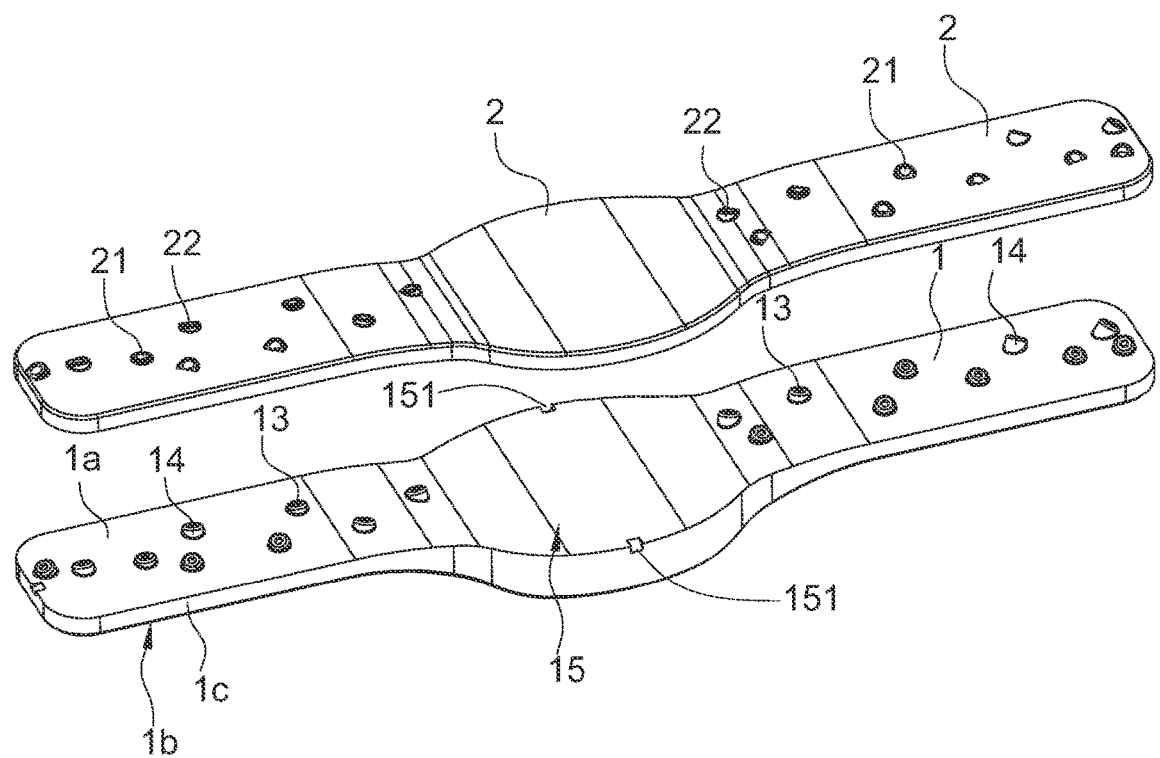
FIG. 10 is an exploded view of a spray arm according to Embodiment 2 of the present invention.
Figure 11:
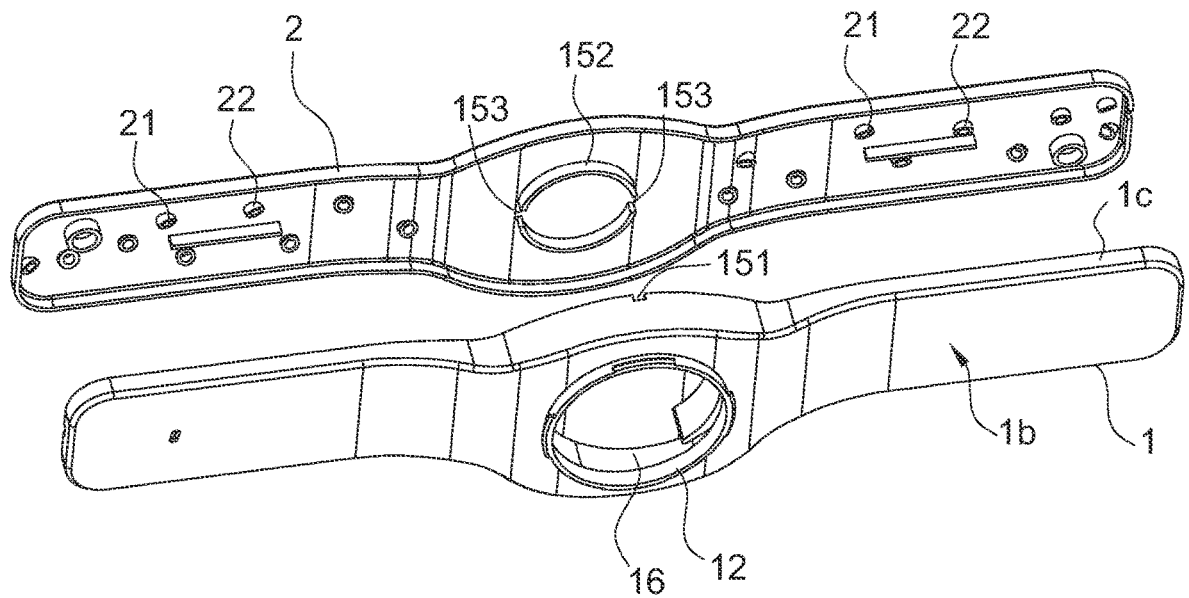
FIG. 11 is a perspective view of FIG. 10 (viewed from the bottom)
Figure 12:
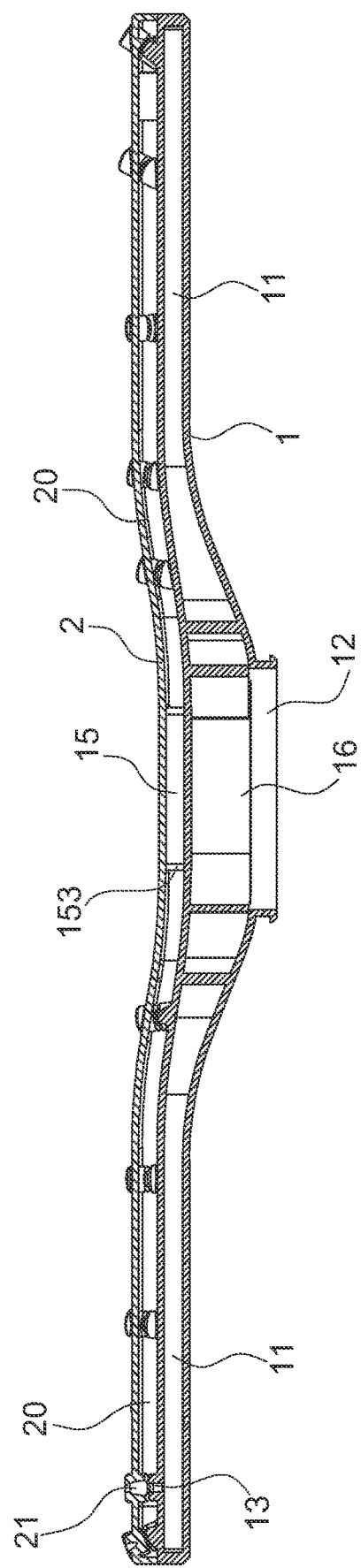
FIG. 12 is a sectional view of the spray arm according to Embodiment 2 of the present invention.
Figure 13:
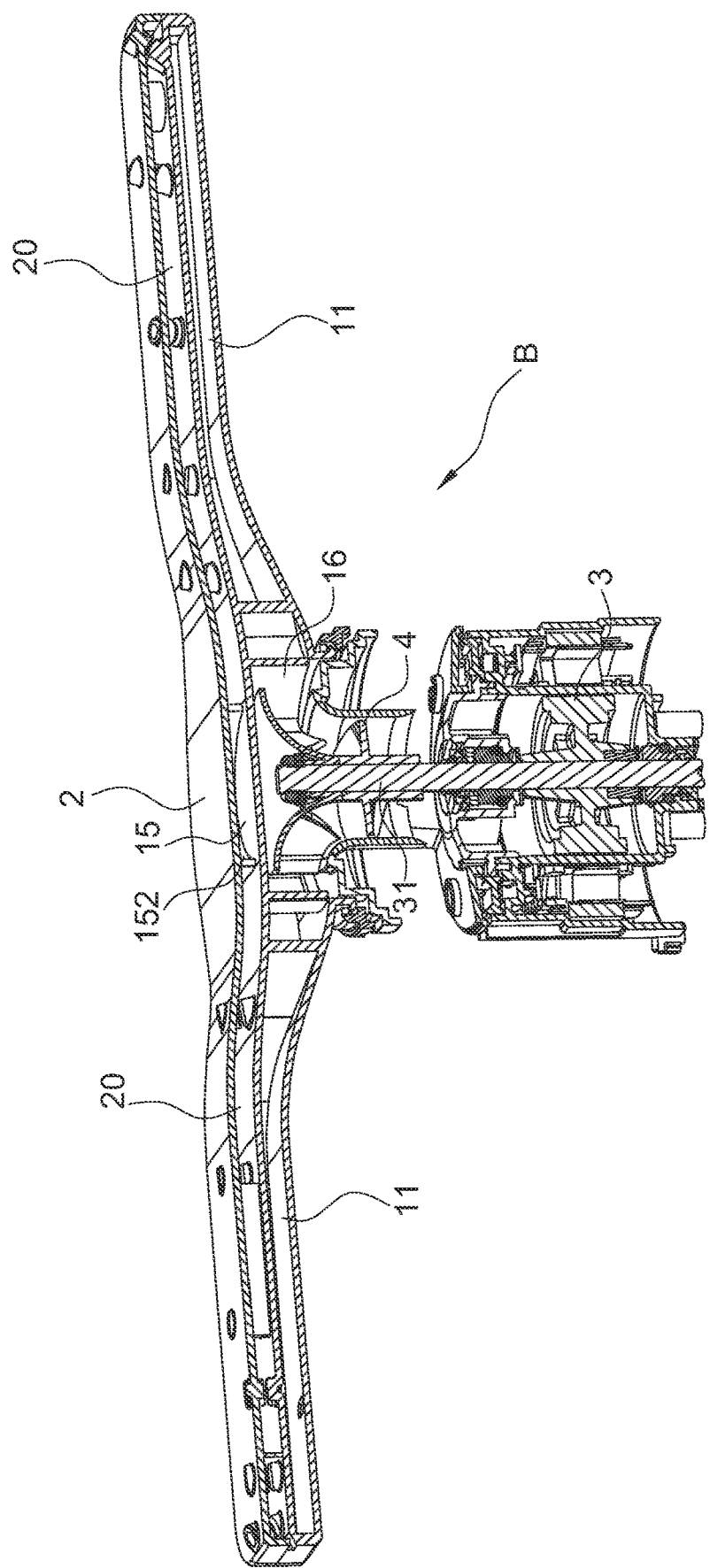
FIG. 13 is a sectional view of a water pumping mechanism according to Embodiment 2 of the present invention.

FIGS. 10-12 show a second preferred embodiment of the water pumping mechanism B with the spray arm of the present invention. The difference between the spray arm of this embodiment and the spray arm A in Embodiment 1 is as follows:

In the water pumping mechanism B of this embodiment, a top end of an output shaft 31 of a power mechanism 3 is not higher than a top end of an impeller assembly 4, as shown in FIG. 13. As a result, the body 1 of this embodiment has no such mounting hole 17 at the top of the water collection chamber 16, and further, the spray arm of this embodiment has no such sealing ring 18 and mounting recess 19.

As shown in FIGS. 10-13, a closed and relatively flat wall surface is kept at the top of the water collection chamber 16. The body 1 may still has the annular border 152 arranged at the central portion of the drainage area 15, the annular border 152 has a top and a bottom both resisting against an inner surface of the top plate 2 and the top surface 1a of the body 1 respectively, and the annular border 152 mainly plays a role in supporting and strengthening the top plate 2. The annular border 152 has a plurality of notches 153 for water to flow through facing the left and right ends of the top plate 2, so as to drain accumulated water in the annular border 152.

It is certain that in order to simplify a structure of the spray arm, the annular border 152 can also be omitted in actual production.

Embodiment 3

Figure 14:
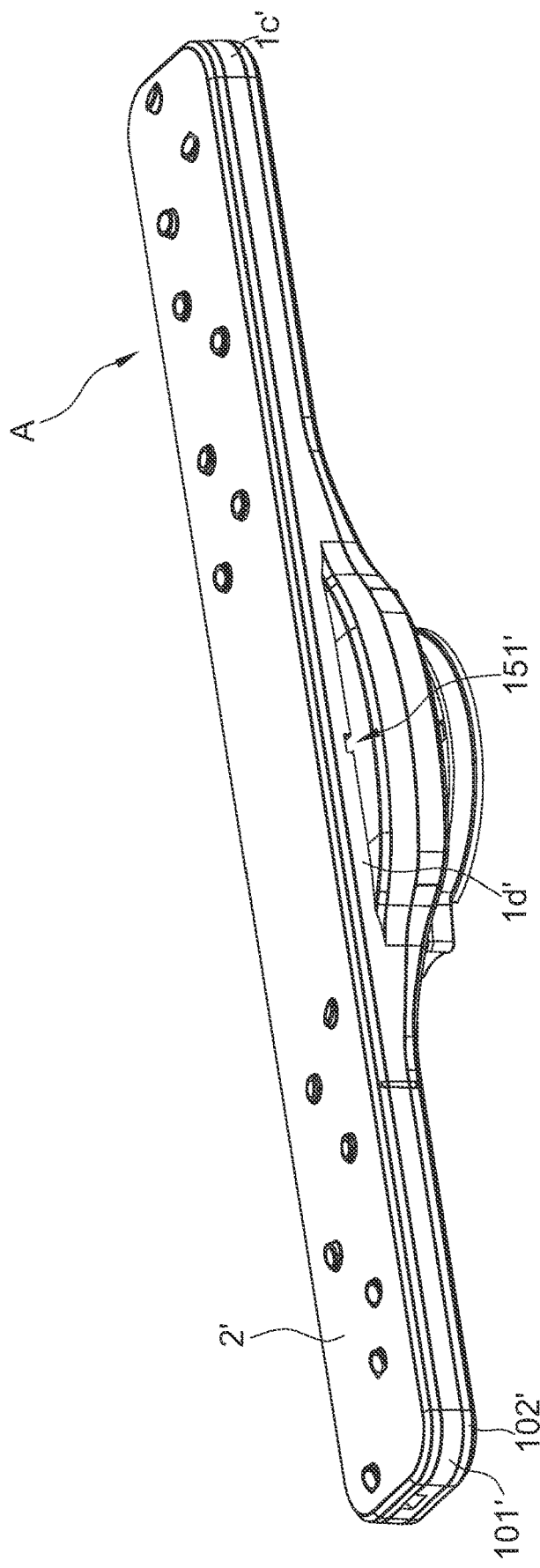
FIG. 14 is a perspective view of a spray arm according to Embodiment 3 of the present invention.
Figure 15:
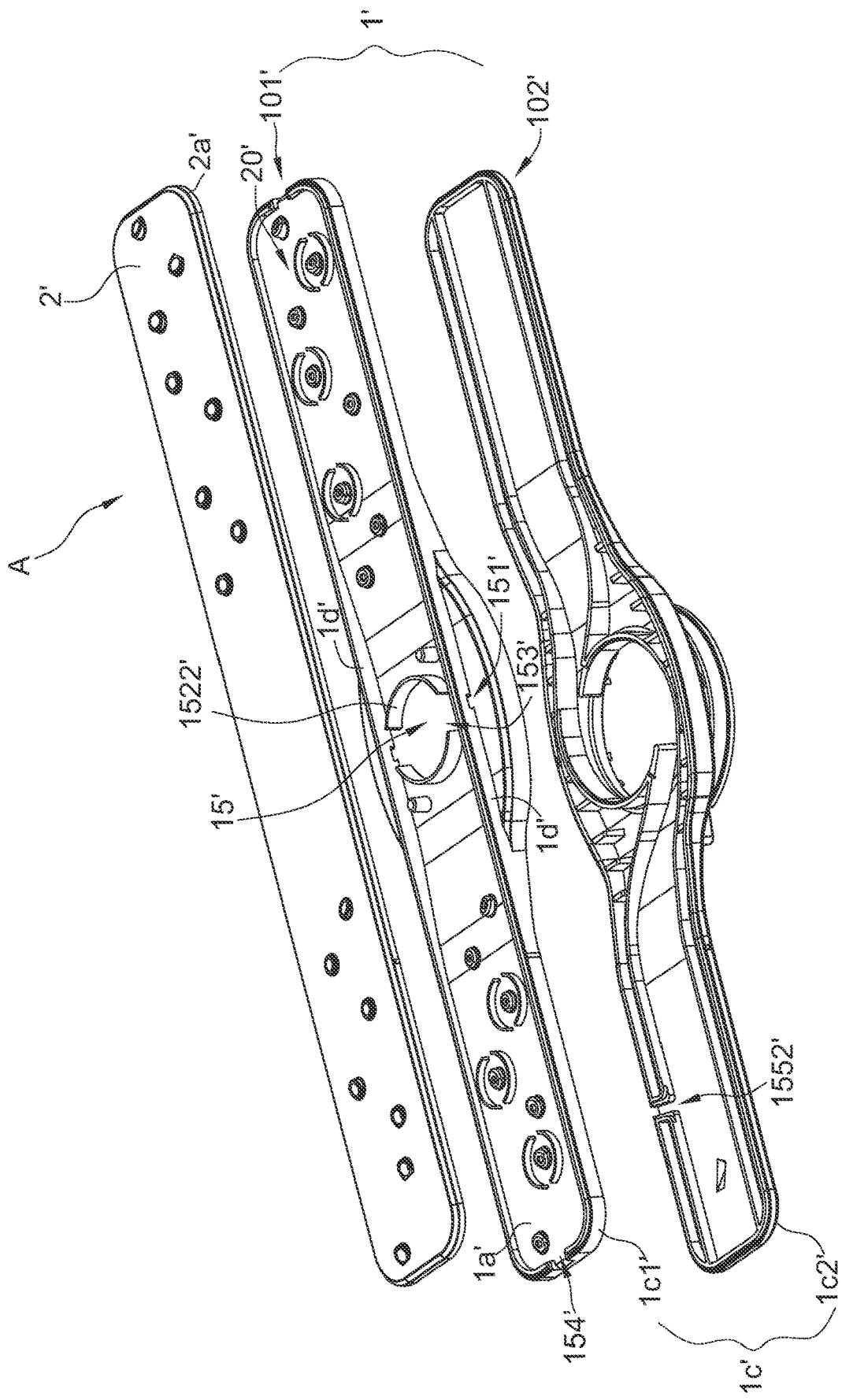
FIG. 15 is an exploded view of the spray arm according to Embodiment 3 of the present invention.
Figure 16:
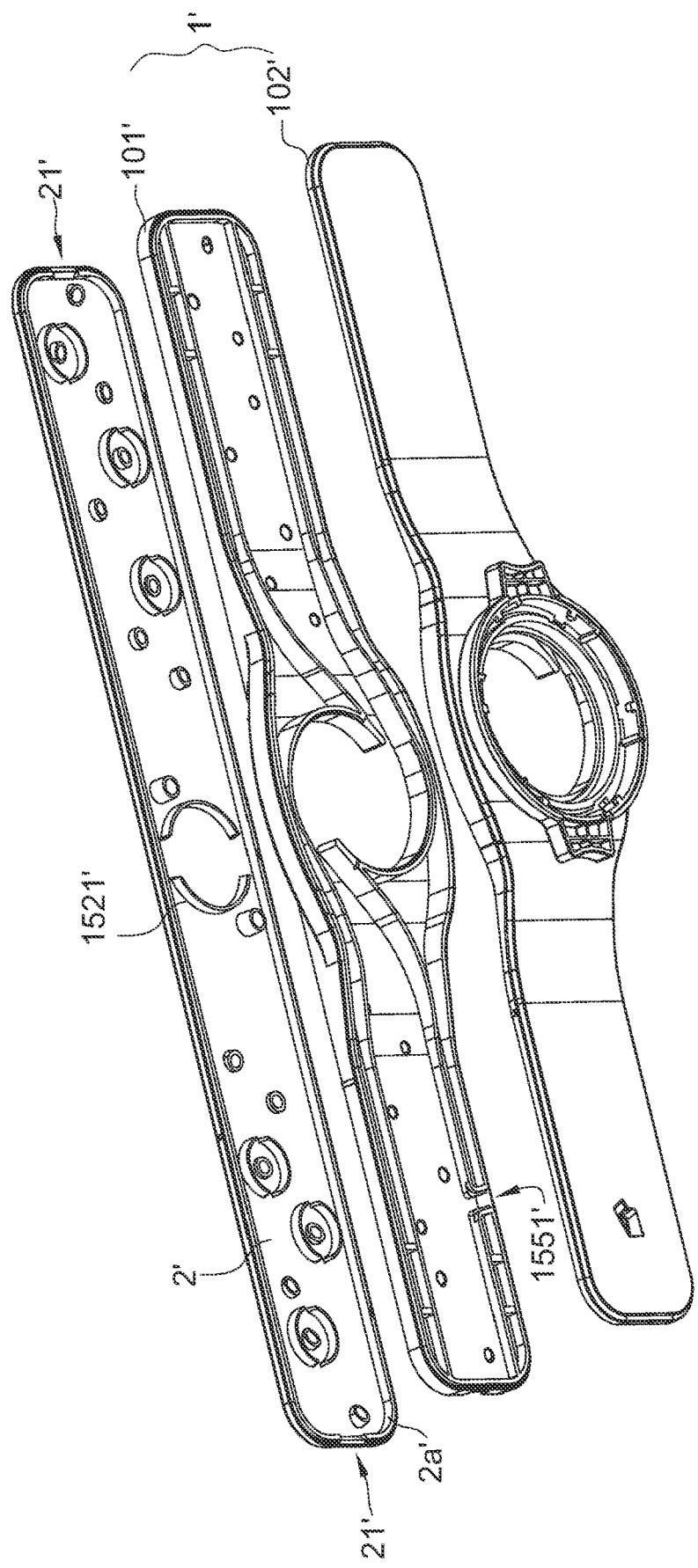
FIG. 16 is another exploded view of the spray arm according to Embodiment 3 of the present invention.

FIGS. 14-16 show a third preferred embodiment of the water pumping mechanism B with the spray arm of the present invention. The difference between the spray arm of this embodiment and the spray arm in Embodiment 2 is as follows:

A top plate 2' is strip-shaped, with a center and two ends consistent in width, and the top plate 2' has a side wall 2a' extending downward from an edge of the top plate 2'.

A body 1' is composed of an upper body 101' and a lower body 102' assembled together, central portions of the upper body 101' and the lower body 102' are wider than their left ends and right ends, and the side wall 1c' of the body 1' is composed of an upper side wall 1c1' of the upper body 101' and a lower side wall 1c2' of the lower body 102'.

The upper side wall 1c1' has an upper water spray hole 1551', and the lower side wall 1c2' is correspondingly has a lower water spray hole 1552', and the upper water spray hole and the lower water spray hole are assembled face to face to form a complete water spray hole for adjusting a rotating speed of the spray arm.

The upper body 101' has a top wall 1d' extending upward from the top surface 1a' of the upper body 101', and the top wall 1d' matches the side wall 2a' of the top plate 2' in shape. When the top plate 2' covers the body 1', the top wall 1d' is hermetically spliced with the side wall 2a' of the top plate 2', and jointly defines the air collection chamber 20 together with an inner surface of the top plate 2' and the top surface 1a of the upper body 101'.

In this embodiment, a first air inlet 154' is located at an end of the upper side wall 1c1' of the body 1' has, and a second air inlet 21' corresponding to the first air inlet 154' is located at the side wall 2a' of the top plate 2'. The first air inlet 154' and the second air inlet 21' are spliced to form a complete air inlet, but it is certain that only one of the top plate 2' or the upper side wall 1c1' of the body 1' has the air inlet.

The top plate 2' has an annular border arranged at the central portion of a drainage area 15' which is defined through an upper annular border 1521' arranged on the inner surface of the top plate 2' and a lower annular border 1522' arranged on the upper body 101' assembled together.

A water outlet 151' is arranged at the central portion of the top surface 1a' of the upper body 101'. Specifically, an edge of the drainage area 15' is defined by the top wall 1d' of the upper body 101'. The water outlet 151' is arranged at the bottom of the top wall 1d'. The water outlet 151' is rectangular, and a plurality of notches 153' on the lower annular border 1522' exactly faces the water outlet 151.

It should be noted that in the description and claims of the present invention, the terms used to indicate direction, such as "front, back", "up, down", "left, right", "side, top, bottom", etc. are used to describe structures and elements of the present invention for better explanation. And these terms used here are based on an orientation in the accompanying drawings. Since the embodiments disclosed by the present invention can be set in different directions, these terms indicating directions are only used as explanations and should not be used as restrictions. For example, the verbs "up", "down" should not be limited to the direction opposite or consistent with the gravity.

The invention claimed is:

1. A spray arm, comprising:
    a body (1;1') having a top surface (1a;1a'), a bottom surface (1b) and a side wall (1c;1c') between the top surface (1a;1a') and the bottom surface (1b);
    a top plate (2;2') disposed above the body (1;1');
    wherein,
    the body (1;1') has a flow channel (11) extending along a length of the body (1;1');
    the body (1;1') has a water inlet (12) in communication with the flow channel (11) arranged on the bottom surface (1b) of the body (1;1');
    the body (1;1') has a plurality of water spray holes (13) arranged on the top surface (1a;1a') and/or the sidewall (1c;1c') of the body (1;1');
    an air collection chamber (20;20') for storing air is defined between the top plate (2;2') and the top surface (1a;1a') of the body (1;1'), the positions of the water spray holes (13) are distributed corresponding to the air collection chamber (20;20');
    the top plate (2;2') has a plurality of spray openings (21) each corresponding to one water spray hole (13), and a gap (100) where negative pressure is generated during water flow spraying is formed between a top end of each water spray hole (13) and a bottom end of the corresponding spray opening (21);
    and an air inlet (154) in communication with the air collection chamber (20;20') is arranged on the top plate (2;2') and/or the side wall (1c;1c') of the body (1;1');
    the body (1;1') has two ends and a central portion, the top surface (1a;1a') of the body (1;1') has a recessed area sinking downward which is defined as a drainage area (15;15'), a water outlet (151;151') for draining water is arranged at an edge of the drainage area (15;15').

2. The spray arm of claim 1, wherein the drainage area (15;15') is the recessed area sinking downward gradually from the two ends to the central portion of the top surface (1a;1a') of the body (1;1').

3. The spray arm of claim 1, wherein the top plate (2') has a top wall and a side wall (2a'), the body (1;1') has a top wall (1d') extending upward from the top surface (1a') of the body (1;1') corresponding to the side wall (2a') of the top plate (2'), the edge of the drainage area (15;15') is enclosed by the top wall (1d'), and the water outlet (151') is located at a bottom of the top wall (1d').

4. The spray arm of claim 1, wherein the body (1) has a water collection chamber (16) in communication with the water inlet (12) at the central portion of the body (1) and under the top surface (1a) of the body (1), and the drainage area (15) is located above the water collection chamber (16).

5. The spray arm of claim 4, wherein the body (1) has a mounting hole (17) at the top surface (1a) of the body (1) corresponding to the water collection chamber (16), the mounting hole (17) is in communication with the drainage area (15) and is for receiving an output shaft (31) of a power mechanism (3), a sealing ring (18) is arranged in the mounting hole (17) to prevent water from entering the air collection chamber (20) from the water collection chamber (16).

6. The spray arm of claim 5, wherein the body (1) has a mounting recess (19) arranged around the mounting hole (17) and opening toward the water collection chamber (16), the sealing ring (18) is arranged inside the mounting recess (19), the sealing ring (18) has a shaft hole (181) at a center of the sealing ring (18) for receiving the output shaft (31), and the sealing ring (18) resists against an inner wall of the mounting recess (19).

7. The spray arm of claim 6, wherein a gap (170) is defined between an inner wall of the mounting hole (17) of the body (1) and a periphery of the output shaft (31), the sealing ring (18) has an annular liquid collection recess (182) opening upward around the shaft hole (181), the mounting hole (17) is in communication with the liquid collection recess (182).

8. The spray arm of claim 4, wherein an annular border (152) is arranged at the drainage area (15) between an inner surface of the top plate (2) and the top surface (1a) of the body (1), and the annular border (152) has a plurality of notches (153) for water to go through.

9. The spray arm of claim 1, wherein the water outlet (151) is located at the top surface (1a) of the body (1), and the body (1) has an inclined diversion plane (1511) at the bottom of the water outlet (151) which gradually inclines downward from inside to outside of the body (1), a top of the inclined diversion plane (1511) is approximately flush with the top surface (1a) of the body (1).

10. The spray arm of claim 1, wherein the thickness of the central portion of the body (1) is greater than the thicknesses of the flow channel at two sides, and the central portion of the body (1) sinks downward relative to the flow channel at two sides of the central portion of the body (1).

11. A water pumping mechanism with the spray arm of claim 1, comprising:
a power mechanism (3);
an impeller assembly (4) having an upper portion and a lower portion;
the spray arm (A);
wherein,
the upper portion of the impeller assembly (4) is a centrifugal impeller that passes through the water inlet (12) and is located inside the spray arm (A), and the lower portion of the impeller assembly (4) is an axial impeller arranged below the water inlet (12), the power mechanism (3) is arranged below the impeller assembly (4), and an output shaft (31) is connected to the impeller assembly (4).

12. A cleaning machine with the water pumping mechanism of claim 11, comprising: a box having a bottom;
wherein,
the water pumping mechanism (B) is disposed at the bottom of the box for pumping the water at the bottom of the box upward through the spray arm (A).

13. A spray arm, comprising:
a body (1;1') having a top surface (1a;1a'), a bottom surface (1b) and a side wall (1c; 1c') between the top surface (1a;1a') and the bottom surface (1b);
a top plate (2;2') disposed above the body (1;1');
wherein,
the body (1;1') has a flow channel (11) extending along a length of the body (1;1');
the body (1;1') has a water inlet (12) in communication with the flow channel (11) arranged on the bottom surface (1b) of the body (1;1');
the body (1;1') has a plurality of water spray holes (13) arranged on the top surface (1a;1a') and/or the sidewall (1c;1c') of the body (1;1');
an air collection chamber (20;20') for storing air is defined between the top plate (2;2') and the top surface (1a;1a') of the body (1;1'), the positions of the water spray holes (13) are distributed corresponding to the air collection chamber (20;20');
the top plate (2;2') has a plurality of spray openings (21) each corresponding to one water spray hole (13), and a gap (100) where negative pressure is generated during water flow spraying is formed between a top end of each water spray hole (13) and a bottom end of the corresponding spray opening (21);
and an air inlet (154) in communication with the air collection chamber (20;20') is arranged on the top plate (2;2') and/or the side wall (1c;1c') of the body (1;1');
the body (1) has an inclined plane (1541) at the bottom of the air inlet (154) which gradually inclines downward from inside to outside of the body (1), a top of the inclined plane (1541) is approximately flush with the top surface (1a) of the body (1).

14. The spray arm of claim 13, wherein the air inlet (154) is located at the side wall (1c) at the end of the body (1).

15. The spray arm of claim 13, wherein the body (1) has a plurality of first nozzles (14) each protruding upward from the top surface (1a) of the body (1) around a corresponding water spray hole (13), and correspondingly, the top plate (2) has a plurality of second nozzles (22) each extending upward around a corresponding spray opening (21).

16. The spray arm of claim 15, wherein each first nozzle (14) has a tapered section (141) and a first straight section (142) connected to the tapered section (141) arranged along a direction of water flow, and an inner diameter of the tapered section (141) gradually decreases along the direction of water flow.

17. The spray arm of claim 15, wherein an inner diameter of each second nozzle (22) is greater than an inner diameter of a top end of each first nozzle (14).

18. The spray arm of claim 15, wherein an axial length of each second nozzle (22) is 5 mm-7 mm.

19. The spray arm of claim 15, wherein a width of the gap (100) between the top end of each first nozzle (14) and a bottom end of each second nozzle (22) is 2 mm-5 mm.

20. The spray arm of claim 13, wherein the plurality of water spray holes (13) is located at the side wall (1c') of the body (1').

* * * * *